June 27, 1944.  A. C. ANDERSEN  2,352,358

ADJUSTABLE AUTOMOBILE SEAT

Filed Oct. 12, 1939  3 Sheets-Sheet 1

INVENTOR.
ANDREW CHRISTIAN ANDERSEN,
BY Barnes, Kisselle, Laughlin & Raisch
ATTORNEYS.

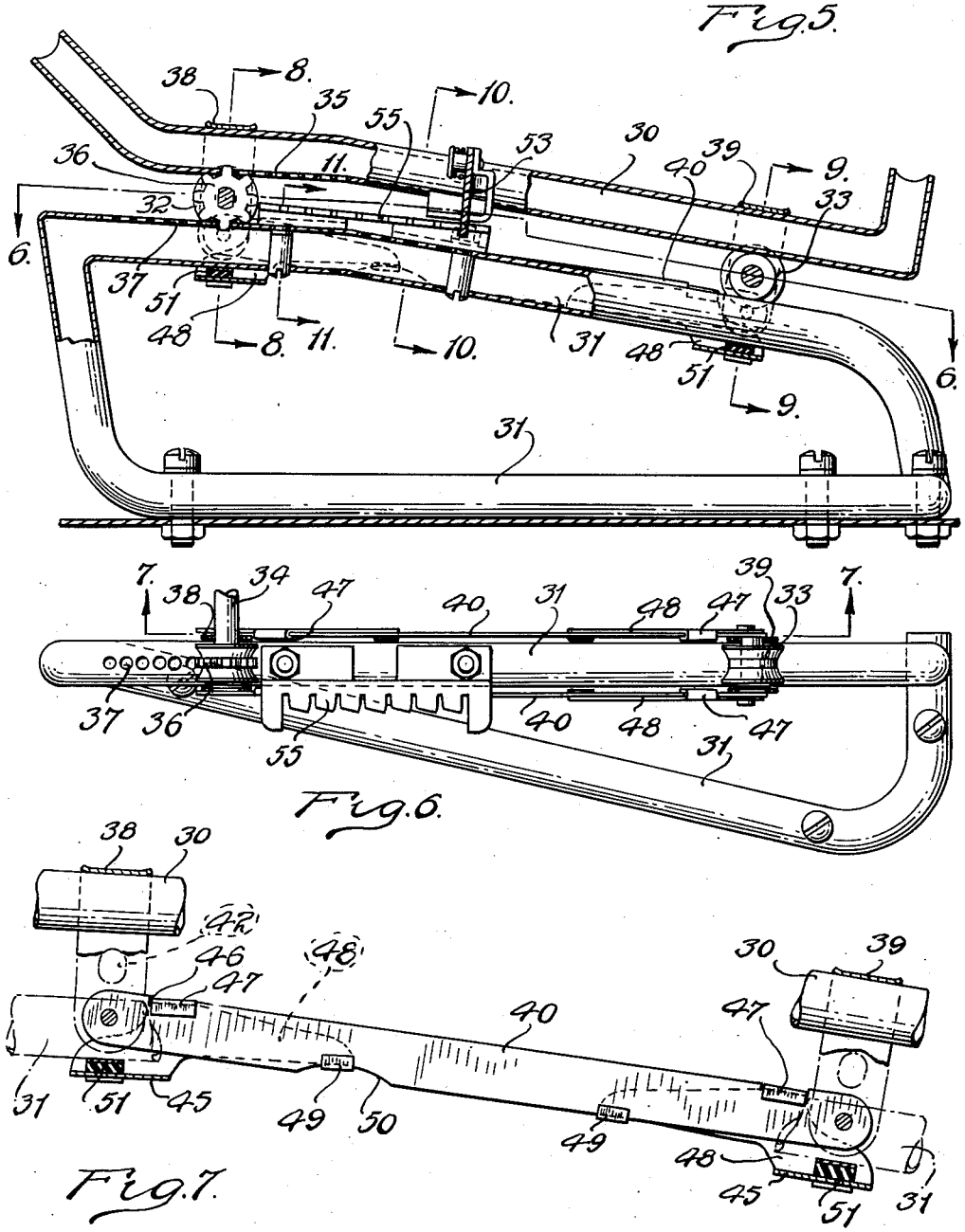

June 27, 1944.         A. C. ANDERSEN         2,352,358
ADJUSTABLE AUTOMOBILE SEAT
Filed Oct. 12, 1939         3 Sheets-Sheet 3

INVENTOR.
ANDREW CHRISTIAN ANDERSEN
BY Barnes, Kisselle, Laughlin & Raisch
ATTORNEYS.

Patented June 27, 1944

2,352,358

UNITED STATES PATENT OFFICE 2,352,358

ADJUSTABLE AUTOMOBILE SEAT

Andrew Christian Andersen, Detroit, Mich., assignor to Ternstedt Manufacturing Company, Detroit, Mich., a corporation of Michigan Application October 12, 1939, Serial No. 299,177

2 Claims. (Cl. 155—14)

This invention relates to an adjustable automobile seat.

It is current practice in the heating and ventilating of some vehicle bodies to position the heater beneath the front seat. This requires that the seat be spaced above the floor of the vehicle a sufficient distance to facilitate the circulation of heated or cooled air throughout the vehicle forwardly and rearwardly of the front seat.

This invention contemplates, in particular, a seat having an adjustable support which will position the seat sufficiently above the floor of the vehicle to create space for the circulation of heated or cooled air from beneath the seat forwardly and rearwardly throughout the vehicle. More particularly the invention comprises a tubular seat support adjustably supported on rollers which gives the seat adjuster strength coupled with lightness and facile adjustment.

The invention also contemplates a novel yieldable tie-down arrangement which holds the seat down upon its roller supports free from rattle.

In the drawings:

Fig. 5 is a side elevation partly in section showing a modified form of tubular seat adjuster.

Fig. 6 is a section along the line 6—6 of Fig. 5.

Fig. 7 is a section along the line 7—7 of Fig. 6.

Figure 1:
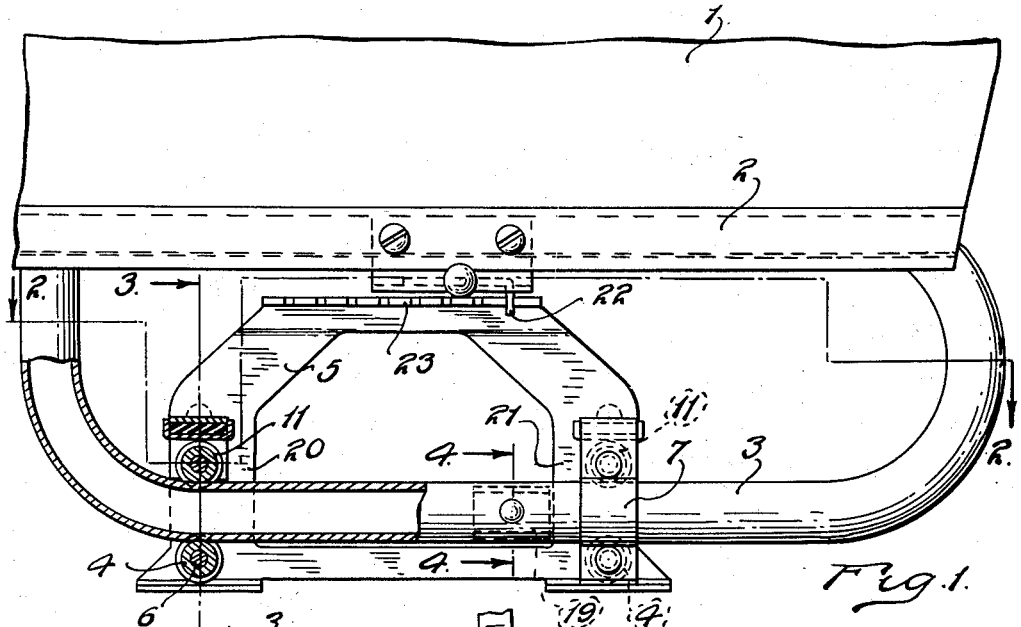
Fig. 1 is a side elevation partly in section showing a portion of the seat and one of the two adjustable supports for supporting the seat.
Figure 2:
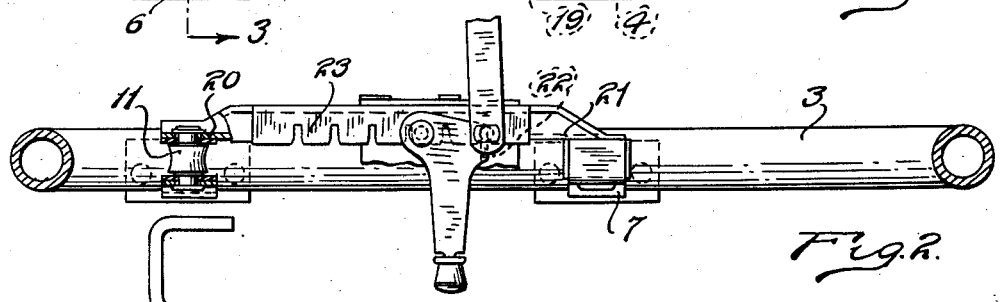
Fig. 2 is a section along the line 2—2 of Fig. 1.
Figures 3, 4:
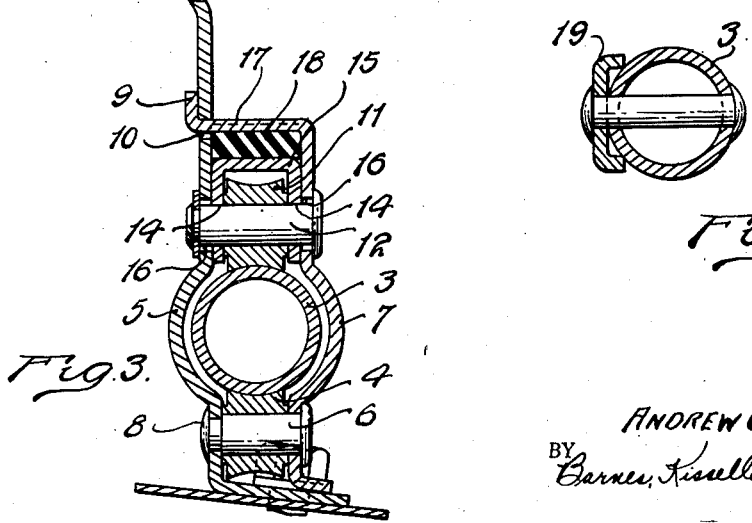
Fig. 3 is a section along the line 3—3 of Fig. 1.
Fig. 4 is a section along the line 4—4 of Fig. 1.
Figure 8:
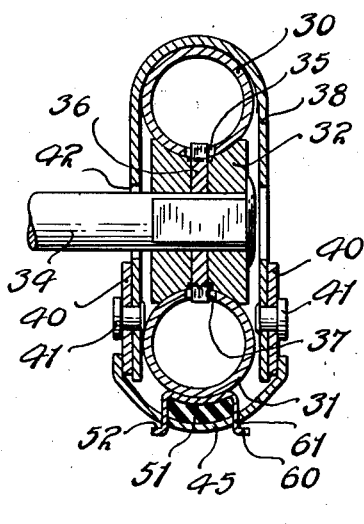
Fig. 8 is a section along the line 8—8 of Fig. 5.
Figure 9:
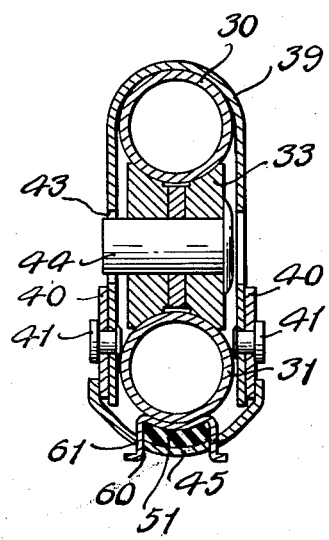
Fig. 9 is a section along the line 9—9 of Fig. 5.
Figure 10:
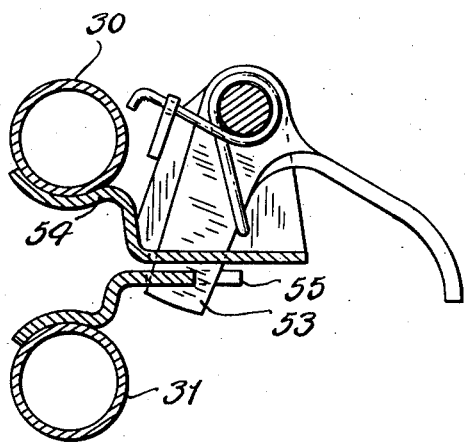
Fig. 10 is a section along the line 10—10 of Fig. 5.
Figure 11:
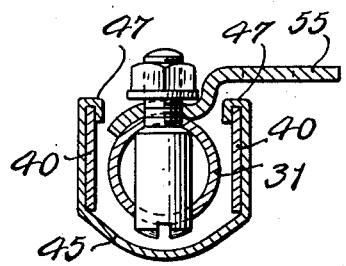
Fig. 11 is a section along the line 11—11 of Fig. 5.

Referring more particularly to the drawings, there is shown a seat cushion 1 supported on a bottom frame 2. Since the seat is supported by a pair of like adjusters, only one need be described.

The adjuster comprises a U shaped tubular support member 3 which is welded or otherwise fixed at its ends to the frame 2. The tubular support 3 is supported upon the spaced rollers 4. The rollers 4 are journaled upon pins 6. The pins 6 are secured in openings provided in the support 5 and bracket 7, the ends of the pins 6 being riveted over as at 8. The support 5 preferably takes the form of a metal stamping. Each bracket 7 has a lug portion 9 at its upper end which is passed through an opening 10 in the support 5. In assembly the lug 9 is passed through the opening 10 and then the pin 6 is passed through the lower end of the bracket 7, roller 4 and support 5 and riveted over at 8. Thus the lug 9 cooperates with the pin 6 to secure the bracket 7 to the support 5.

The tubular support 3 is held down upon the roller 4 by means of the hold-down rollers 11. Each roller 11 is journaled upon a pin 12. The pin 12 has a tight fit in openings 14 in the U shaped member 15 and a loose fit in the openings 16 in support 5 and bracket 7. The openings 16 have a larger circumference than the circumference of the pin 12 so that the pin 12 is free to float in the openings 16. Blocks of rubber 17 are positioned between the members 15 and the upper ends 18 of the bracket 7. The blocks 17 are under sufficient compression to hold the rollers 11 down upon the tubular support 3 to thereby prevent any rattles developing between the tubular support 3 and the lower rollers 4. The clearance between pins 12 and openings 16 prevent the pins from bottoming in the openings.

To limit fore and aft adjustment of the seat upon the rollers 4, a stop in the form of a metal stamping 19 is riveted to the support 3. The stop 19 cooperates with spaced abutments on the support 5. As herein shown these abutments take the form of leg members 20 and 21 forming a part of the support 5. Thus the forward adjustment of the seat is arrested when stop 19 abuts leg 20 and the rearward adjustment of the seat is arrested when the stop 19 abuts leg 21.

The seat is held in adjusted position by means of a latch 22 pivotally supported on the seat bottom frame 2 and arranged to interengage the rack teeth 23 in the upper edge of the support 5.

The modified form of seat adjuster comprises cooperating tubular support members 30 and 31, the former fixed to the seat bottom frame and the latter to the floor. Support member 30 is supported upon member 31 adjacent its front edge by the rollers 32 and adjacent its rear edge by the rollers 33. The rollers 32 are fixed to the equalizing shaft 34 which extends transversely across and beneath the seat bottom. The lower face of the tubular members 30 is provided with spaced perforations 35 which interengage the teeth of gears 36 fixed at the opposite ends of the equalizing shaft 34. The tubular support member 30 rolls upon rollers 32 and 33 which in turn roll upon the lower tubular support member 31 which is provided with spaced openings 37 for the gear 36.

The upper and lower tubular members 30 and 31 and rollers 32 and 33 are held together by a tie-down arrangement in the form of inverted U shaped metal straps 38 and 39. The lower ends of the straps 38 and 39 are held in properly spaced relation by a pair of links 40 secured at each end to the brackets 38 and 39 by rivets 41. The forward strap 38 is provided with an opening 42 for the equalizing shaft 34. The rear strap 39 is provided with an elongated opening 43 through which the axle 44 of roller 33 projects. The opening 43 permits slight up and down movement of the axle 44 but prevents fore and aft movement of the axle 44 relative to the strap 39. The same is true with respect to opening 42 and equalizing shaft 34. Therefore links 40 act through straps 38 and 39 to maintain the rollers 32 and 33 in their properly spaced relationship. The tie-down mechanism also includes members preferably in the form of U shaped metal stampings 45 secured to the links 40 in notches 46 by the turned over lugs 47. Each member 45 is also provided with an arm 48, the end of which is provided with a bent over lug 49 which engages the lower edge of the member 40 in the notch 50. The member 45 carries a rubber block 51 provided with a U shaped metal cover plate 52 which acts as a bearing and slidably engages the lower face of the tubular member 31. Legs 60 of plate 52 pass through and have a sliding fit with member 45 in openings 61. The rubber block 51 is under compression and thus acts through the straps 38 to hold the tubular members and rollers against rattling. Since the member 45 is secured to the links 40 at longitudinally spaced points 47 and 49, it will not turn as the seat support 30 is adjusted fore and aft along the support 31.

The seat is held in adjusted position by the pivoted latch member 53 carried by the bracket 54 which is fixed to the tubular member 30. The latch 53 interengages rack 55 fixed to the lower support member 31.

I claim:

1. In a vehicle seat adjuster, a pair of support members one of which is adapted to be fixed to the seat and the other of which is adapted to be fixed to the floor of the vehicle, one of said members having a runner portion, a tie-down member secured to one of said support members to form a housing through which the runner portion of the other support member passes, a roller rotatably supported by the said tie-down member and cooperating support member in the lower portion of said housing upon which the runner portion of the other support member runs, and a cooperating roller positioned in the housing above the said runner member having a rolling contact with the said runner portion, and resilient pressure means positioned between the tie-down member and upper roller exerting a downward pressure on the upper roller whereby the said runner portion is retained in a rattle-proof running engagement with the lower support roller.

2. In a vehicle seat adjuster, a pair of support members one of which is adapted to be fixed to the seat and the other of which is adapted to be fixed to the floor of the vehicle, one of said members having a runner portion, a tie-down member secured to one of said support members to form a housing through which the runner portion of the other support member passes, a roller rotatably supported by the said tie-down member and cooperating support member in the lower portion of said housing upon which the runner portion of the other support member runs, and a cooperating roller positioned in the housing above the said runner member having a rolling contact with the said runner portion, an axle for said roller having a floating fit in the openings provided therefor in the said tie-down and cooperating support members, and resilient pressure means positioned between the tie-down member and upper roller exerting a downward pressure on the upper roller whereby the said runner portion is retained in a rattle-proof running engagement with the lower support roller.

ANDREW CHRISTIAN ANDERSEN.